United States Patent
Fischer et al.

(10) Patent No.: US 9,656,408 B2
(45) Date of Patent: May 23, 2017

(54) METHOD FOR PRODUCING THERMOPLASTIC MOLDING COMPOUNDS, AND THERMOPLASTIC MOLDING COMPOUNDS PRODUCED ACCORDING THERETO

(71) Applicant: INEOS STYROLUTION GROUP GMBH, Frankfurt (DE)

(72) Inventors: Wolfgang Fischer, Walldorf (DE); Norbert Niessner, Friedelsheim (DE)

(73) Assignee: INEOS STYROLUTION GROUP GMBH (DE)

( * ) Notice: Subject to any disclaimer, the term of this patent is extended or adjusted under 35 U.S.C. 154(b) by 0 days.

(21) Appl. No.: 14/903,830

(22) PCT Filed: Jul. 8, 2014

(86) PCT No.: PCT/EP2014/064555
§ 371 (c)(1),
(2) Date: Apr. 26, 2016

(87) PCT Pub. No.: WO2015/004112
PCT Pub. Date: Jan. 15, 2015

(65) Prior Publication Data
US 2016/0243728 A1     Aug. 25, 2016

(30) Foreign Application Priority Data
Jul. 11, 2013  (EP) .................... 13176178

(51) Int. Cl.
*B29B 7/42* (2006.01)
*B29C 47/76* (2006.01)
*B29B 7/00* (2006.01)
*B29B 7/84* (2006.01)
*C08J 3/00* (2006.01)
*C08L 25/12* (2006.01)
*C08L 33/20* (2006.01)
*B29K 9/00* (2006.01)
*B29C 47/00* (2006.01)
*B29K 21/00* (2006.01)
*B29C 47/40* (2006.01)
*B29K 33/00* (2006.01)
*B29K 55/02* (2006.01)
*B29K 69/00* (2006.01)
*B29K 77/00* (2006.01)

(52) U.S. Cl.
CPC ............... *B29B 7/42* (2013.01); *B29B 7/007* (2013.01); *B29B 7/842* (2013.01); *B29B 7/845* (2013.01); *B29C 47/761* (2013.01); *B29C 47/763* (2013.01); *C08J 3/005* (2013.01); *C08L 25/12* (2013.01); *C08L 33/20* (2013.01); *B29C 47/003* (2013.01); *B29C 47/0019* (2013.01); *B29C 47/0023* (2013.01); *B29C 47/40* (2013.01); *B29C 47/767* (2013.01); *B29K 2009/00* (2013.01); *B29K 2021/00* (2013.01); *B29K 2033/12* (2013.01); *B29K 2055/02* (2013.01); *B29K 2069/00* (2013.01); *B29K 2077/00* (2013.01); *C08J 2325/12* (2013.01); *C08J 2333/20* (2013.01)

(58) Field of Classification Search
CPC ........... B29B 7/42; B29B 7/007; B29B 7/842; B29B 7/845; B29C 47/761; B29C 47/763; B29C 47/0019; B29C 47/0023; B29C 47/003; B29C 47/40; B29C 47/767; C08J 3/005; C08J 2325/12; C08J 2333/20; C08L 25/12; C08L 33/20; B29K 2009/00; B29K 2021/00; B29K 2033/12; B29K 2055/02; B29K 2069/00; B29K 2077/00
See application file for complete search history.

(56) References Cited

U.S. PATENT DOCUMENTS

| | | | |
|---|---|---|---|
| 2,897,183 | A | 7/1959 | Christl et al. |
| 3,530,094 | A | 9/1970 | Schnell et al. |
| 3,535,280 | A | 10/1970 | Schnell et al. |
| 4,421,875 | A | 12/1983 | McKee et al. |
| 4,634,734 | A | 1/1987 | Hambrecht et al. |
| 5,055,244 | A | 10/1991 | Gohlisch |
| 5,057,593 | A | 10/1991 | Marshall et al. |
| 5,260,375 | A | 11/1993 | Lausberg et al. |
| 5,286,801 | A | 2/1994 | Besecke et al. |
| 5,851,463 | A | 12/1998 | Guntherberg et al. |
| 5,852,113 | A | 12/1998 | Guntherberg et al. |
| 5,889,111 | A | 3/1999 | McKee et al. |
| 5,910,276 | A | 6/1999 | Guntherberg et al. |
| 5,958,316 | A | 9/1999 | Guntherberg et al. |

(Continued)

FOREIGN PATENT DOCUMENTS

| | | |
|---|---|---|
| CA | 1056975 A | 6/1979 |
| CH | 512979 A | 9/1971 |

(Continued)

OTHER PUBLICATIONS

English abstract of JP 60-222223.
English translation of the International Preliminary Report on Patentability in corresponding International Application No. PCT/EP2014/064555, dated Jan. 14, 2016.
Kunststoffhandbuch, "Polystyrol," vol. V., Carl-Hanser-Verlag, Munich, 1969, p. 118 seq.
English abstract of CH512979, retrieved from espace on Apr. 25, 2016; publication date of Sep. 30, 1971.

(Continued)

*Primary Examiner* — Nathan M Nutter
(74) *Attorney, Agent, or Firm* — J.A. Lindeman & Co., PLLC

(57) ABSTRACT

A method for extruding thermoplastic molding compounds, the production of thermoplastic molding compounds taking place in a screw machine with mechanical dewatering, and impact-modified molding compounds or polymer blends which contain impact-modified thermoplastic materials that were produced by means of the method according to the invention.

13 Claims, 1 Drawing Sheet

(56) References Cited

U.S. PATENT DOCUMENTS

| | | | |
|---|---|---|---|
| 6,165,399 | A | 12/2000 | Guntherberg et al. |
| 2003/0225219 | A1 | 12/2003 | Eichenauer et al. |
| 2006/0034962 | A1 | 2/2006 | Guntherberg et al. |

FOREIGN PATENT DOCUMENTS

| | | | |
|---|---|---|---|
| DE | 1260135 | B | 2/1968 |
| DE | 1495730 | A | 4/1969 |
| DE | 1300266 | B | 7/1969 |
| DE | 2427960 | B1 | 6/1975 |
| DE | 2610068 | A1 | 9/1977 |
| DE | 3106959 | A1 | 9/1982 |
| DE | 3149046 | A1 | 6/1983 |
| DE | 3149358 | A1 | 6/1983 |
| DE | 4123122 | A1 | 1/1993 |
| DE | 4237174 | A1 | 5/1994 |
| DE | 4443886 | A1 | 6/1996 |
| DE | 19547675 | A1 | 6/1997 |
| EP | 062901 | A2 | 10/1982 |
| EP | 0258741 | A2 | 3/1988 |
| EP | 0443432 | A2 | 8/1991 |
| EP | 0512333 | A1 | 11/1992 |
| EP | 0534235 | A1 | 3/1993 |
| EP | 0734825 | A1 | 10/1996 |
| EP | 0734826 | A1 | 10/1996 |
| EP | 0735077 | A1 | 10/1996 |
| EP | 0735078 | A1 | 10/1996 |
| EP | 1229346 | A1 | 8/2002 |
| EP | 1400337 | A1 | 3/2004 |
| EP | 2584001 | A1 | 4/2013 |
| EP | 2728510 | A1 | 5/2014 |
| GB | 1124911 | A | 8/1968 |
| GB | 1570404 | A | 7/1980 |
| JP | 57167303 | A | 10/1982 |
| JP | 60-222223 | A | 11/1985 |
| JP | 2286208 | A | 11/1990 |
| WO | 98/13412 | A1 | 4/1998 |

OTHER PUBLICATIONS

English abstract of DE 3106959, retrieved from espace on Mar. 15, 2016; publication date of Sep. 9, 1982.
English abstract of DE 3149046, retrieved from espace on Mar. 15, 2016; publication date of Jun. 16, 1983.
English abstract of DE 4123122, retrieved from espace on Apr. 25, 2016; publication date of Jan. 14, 1993.
English abstract of DE 4237174, retrieved from espace on Apr. 25, 2016; publication date of May 5, 1994.
English abstract of DE 19547975, retrieved from espace on Apr. 25, 2016; publication date of Jun. 26, 1997.
English abstract of EP 0258741, retrieved from espace on Mar. 15, 2016; publication date of Mar. 9, 1988.
English abstract of EP 0534235, retrieved from espace on Mar. 15, 2016; publication date of Mar. 31, 1993.
English abstract of JP 57167303, retrieved from espace on Apr. 21, 2016; publication date of Oct. 15, 1982.

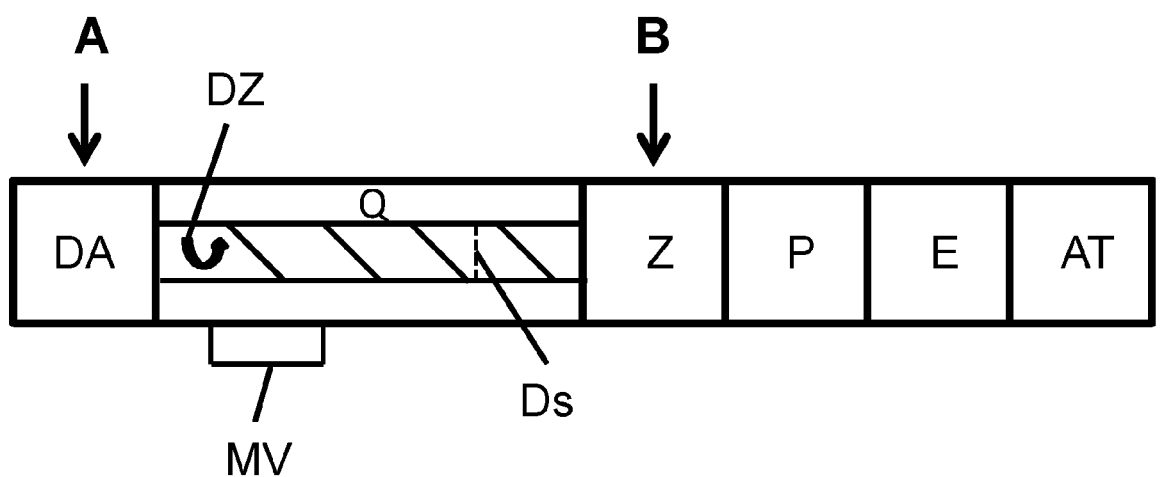

METHOD FOR PRODUCING THERMOPLASTIC MOLDING COMPOUNDS, AND THERMOPLASTIC MOLDING COMPOUNDS PRODUCED ACCORDING THERETO

The present invention relates to a process for the production and extrusion of thermoplastic compositions and, respectively, molding compositions, where said process can markedly reduce degradation of the material in comparison with the prior art. The process serves for the production of thermoplastic molding compositions in a screw-based machine with mechanical dewatering. The invention further relates to impact-modified thermoplastic molding compositions and, respectively, polymer blends which comprise impact-modified thermoplastics produced by the process of the invention.

It is known that thermoplastics can be devolatilized and dewatered by using screw-based machines. EP-A 0735077 describes a process for the production of impact-modified thermoplastics via mechanical dewatering of an elastomeric component and mixing with a thermoplastic polymer in a screw-based machine. The dewatering apertures have retention screws and are operated at superatmospheric pressure. No metal-wire-mesh composite sheet is used in that document for the retention of the extruded composition on the dewatering apertures or vents.

JP S02-286208 (1990) discloses three different dewatering processes using an extruder equipped with two screws. In each case moisture is removed from the extrusion composition in liquid form and also in gaseous form by way of strainer cages.

The document JP H 57-167303 (1982) says that an extrusion composition, by way of example in this case slurries of polymer particles, is fed into a twin-screw extruder, dewatered, devolatilized, and kneaded. Upstream of the compression zone water in liquid form can emerge from the extruder. Residual moisture can escape in gaseous form. Strainer cages are used as dewatering apertures.

JP H 60-222223 (1985) discloses a process in which water in liquid form is removed from an extrusion material, preferably from a food, but also from other materials. The dewatering is achieved by using a twin-screw extruder. The moisture is discharged backwards through an aperture connected to a vacuum pump.

WO 1998/13412 describes screw-based machines having at least one squeeze zone with at least one baffle and one associated dewatering aperture upstream before the first baffle. The screw-based machines moreover comprise devolatilization zones situated after the final plastifying zone. The vents and dewatering apertures can have a device that prevents escape of extrusion material. Retention screws are described as preferred for this purpose. It is moreover said that strainer cages or screens are not suitable for covering dewatering apertures, because of excessively rapid blocking of strainer cages. Screens moreover have the disadvantage of mechanical instability. In accordance with WO 1998/13412 it is preferable to avoid covering vents.

Screens or filters are used in extrusion devices to remove contamination from the melt. By way of example, U.S. Pat. No. 5,055,244, EP-A1 229 346, and EP-A2 728 510 disclose that, before injection molding, the extrusion material can be forced through a filter to remove contamination. DE-A1 41 23 122 moreover discloses that extremely thin filaments can be produced by using an extrusion aperture covered by a reinforced screen permeable to 40μ.

DE-A 42 37 174 describes an injection-molding machine for the devolatilization of hygroscopic injection-molding materials. The screw runs within a cylinder, the wall of which is composed of more than one layer. The interior wall is composed of a sintered metal. This is permeable to water vapor. The vapor that has passed through the sintered metal is transported away through channels located in the cylinder wall. There is an exterior wall as a jacket surrounding the cylinder.

CH-A 512 979 discloses an extrusion device which is intended for plastics and which also can serve for the dewatering of the materials to be treated, and which is based on a similar principle. The barrel has a sintered metal lining. This can be composed of a series of adjacent sintered metal rings. Each of these sintered metal rings has an external annular channel, which can be evacuated so that the gas separated via the sintered ring can be removed. This design has the disadvantage that it is very complicated.

Retention screws are very effective in preventing the escape of the extrusion material through the vents or dewatering apertures, but require high capital expenditure. They are movable parts, and therefore require regular maintenance. They are also mostly not completely effective in retaining very fine particles of product.

The devices known as "strainer cages" are equipped with areas made of assemblies of thin layers which are intended to retain the extrusion material, but to permit passage of the water vapor or the water through long narrow slits of width generally from 0.1 mm to 1 mm. They retain the extrusion material but allow passage of a high proportion of fine solid particles, or easily become blocked, and therefore require frequent cleaning. The fine particles that are allowed to pass moreover have to be removed regularly, because very fine particles can create a fire risk.

Manufacture of inner barrels of extrusion machines from permeable material, either in continuous form or in the form of sintered rings, is firstly technically complicated. Secondly, cleaning requires complete shutdown of the machines, withdrawal of the screw, and further dismantling of the machine. Technical arrangements of this type are also often inadequate in their ability to withstand the pressures arising in the device.

Use of conventional screens to cover vents or dewatering apertures has not been preferred in the prior art, because these block relatively rapidly and do not adequately withstand the mechanical stresses.

EP-A 1400337 describes a device of the abovementioned type which does not have the disadvantages mentioned. In particular in the device which was found, less than 1 g of fine particles per kg of the extrusion material conducted past each aperture is discharged via gases emerging through the vents.

The device that prevents the escape of extrusion material from the vents is moreover intended to have high mechanical strength, to be easy to clean, and to require little capital expenditure. Accordingly a device is described for the extrusion of thermoplastic molding compositions which comprises at least one vent, where the vent is equipped with a metal-wire-mesh composite sheet (MC), a finely perforated metal sheet or a slit diaphragm. 5-Layer metal-screen composite sheets exhibit advantages over strainer cages and stuffing screws.

The abovementioned documents do not indicate whether and, in appropriate cases, how the process can improve the properties of the extruded plastics—in particular in the case of ABS (acrylonitrile-butadiene-styrene copolymer) and ASA (acrylate-styrene-acrylonitrile copolymer) molding compositions. In particular, high content of degradation products during extrusion is not addressed.

It is therefore an object of the present invention to devise critical properties and running parameters of an extruder in such a way as to minimize degradation products with the same throughout i.e. the same cost-effectiveness.

The prior art of EP-A 1400337 indicates that undesired discharge of extruded material, for example rubber ("crumb loss") can be minimized when a 5-layer metal-wire-mesh composite sheet (MC) is used. The rotation rate (RR) remains unchanged here in comparison with conventional technologies, for example strainer cages and retention screws, at 300 rpm for a screw diameter (Ds) of 58 mm.

The present invention indicates that when a 5-layer metal-wire-mesh composite sheet (MC) is used the extruder rotation rate (RR) can be reduced by more than 10%, preferably more than 20%, and particularly preferably more than 30%, in comparison with the abovementioned rotation rate of an extruder using conventional technology, with the aim, despite higher residence time in the extruder, of reducing the extent of degradation reactions in the product with, at the same time, increased pressure and increased dewatering performance in a squeeze phase or squeeze zone. The content of degradation products, for example 1-butene, and/or the content of residual monomers, for example styrene, can be used to show that the conditions used for processing of the thermoplastic molding composition are non-aggressive.

The thermoplastics used can be various high-molecular-weight or oligomeric compounds which when the temperature is increased become soft once their glass transition temperature has been exceeded. These can be synthetic materials, or else natural products or pharmaceutical products. In one embodiment the thermoplastic molding composition comprises at least one impact-modified copolymer or one impact-modified copolymer blend, and also optionally other components.

Various thermoplastics have been known for many years to the person skilled in the art. The following are mentioned by way of example: polyamides, polycarbonates, styrene polymers, styrene copolymers, and mixtures of these polymers. Among the styrene copolymers are by way of example styrene/acrylonitrile copolymers (SAN), rubber-modified styrene copolymers, such as acrylonitrile/butadiene/styrene copolymers (ABS), and acrylonitrile/acrylate/styrene copolymers (ASA).

In one preferred embodiment the thermoplastic molding composition comprises at least one rubber-modified styrene-acrylonitrile copolymer, where the rubber component is based on an acrylate-styrene-acrylonitrile copolymer (ASA) or on a polybutadiene.

In one particularly preferred embodiment the thermoplastic molding composition comprises at least one rubber-modified styrene-acrylonitrile (ASA) copolymer, with at least one acrylate-styrene-acrylonitrile (ASA) rubber with bimodal particle size distribution and average particle size from 80 nm to 600 nm, or often from 200 nm to 600 nm, and also with an SAN matrix with AN content from 25% by weight to 35% by weight, preferably from 27% by weight to 33% by weight.

Other materials that can be used are derivatives or variants of SAN polymers, ABS, or ASA, for example those based on alpha-methylstyrene or methacrylate, or those comprising other comonomers, for example the material known as methyl methacrylate-acrylonitrile-butadiene-styrene (MABS). It is also possible to use mixtures of two or more different styrene copolymers. It is moreover possible to use rubber-modified styrene copolymers which are based entirely or to some extent on other rubbers, for example on ethylene-butadiene rubbers or on silicone rubbers.

Preference is also given to mixtures ("blends") of the polymers mentioned with polyamides, with polybutylene terephthalates, and/or with polycarbonates. Other thermoplastics are listed individually below.

The process of the invention for the production of thermoplastic molding compositions uses an extruder which consists essentially of the following, in the direction of conveying (in the direction of flow):

a) at least one feed zone (FZ) where a thermoplastic molding composition comprising water and/or comprising another vaporizable liquid is introduced by means of feed equipment into the extruder, where said feed zone (FZ) preferably comprises at least one dewatering aperture equipped with a metal-wire-mesh composite sheet (MC), a finely perforated metal sheet, or a slit diaphragm, b) at least one squeeze zone (SZ) which serves to dewater the thermoplastic molding composition, which comprises at least one baffle, and which also comprises in each case at least one associated dewatering aperture, said at least one dewatering aperture being equipped with a metal-wire-mesh composite sheet (MC), a finely perforated metal sheet, or a slit diaphragm, c) at least one input zone (IZ) where other components of the thermoplastic molding composition in the form of melt are introduced into the extruder, d) at least one plastifying zone (PZ) provided with mixing, kneading, and/or other plastifying elements, e) at least one vent zone (VZ) which has at least one vent and in which further water or liquids are removed from the thermoplastic molding composition as vapor, where at least one of the vents is preferably equipped with a metal-wire-mesh composite sheet (MC), a finely perforated metal sheet, or a slit diaphragm, and f) a metering zone (MZ) at which the thermoplastic molding composition is discharged from the extruder, where the squeeze zone (SZ) in the process uses a screw-based extruder (S) in which the diameter (Ds) of at least one screw is from 30 to 230 mm, in particular from 60 to 220 mm, and where the rotation rate (RR) of the at least one screw of the extruder is from 60 to 270 rpm, in particular 60 to 210 rpm, and where the screw-based extruder (S) used has at least one vent and/or dewatering aperture where there is, secured in the dewatering aperture, at least one metal-wire-mesh composite sheet (MC), with two or more layers, there being at least one smaller-mesh layer present on a coarsely woven, large-mesh but mechanically stable backing layer (first layer), where the location of the layer having the smallest mesh is on a side facing toward the product.

A suitable device for carrying out the process of the invention is per se any screw-based machine which comprises at least one dewatering aperture and which can extrude thermoplastic molding compositions. This definition is intended to include screw-based machines which are used in processes such as injection molding. Screw-based machines are known per se, and reference can therefore be made here to the widely available literature: by way of example it is possible to use screw-based machines of the type known from the abovementioned documents. Screw-based machines generally comprise at least one feed zone (FZ), at least one plastifying zone (PZ), and one metering zone (MZ).

The number, arrangement, and design of the dewatering apertures generally depends on the quantity of the gas that is to be discharged from the screw-based machine. By way of example, the number, arrangement, and geometry of the dewatering apertures in the extrusion of thermoplastic molding compositions comprising water depends on the water content of the thermoplastic molding composition and on the desired residual water content of the final product.

In the invention the screw-based machines have at least one dewatering aperture. They can however also have a plurality of dewatering apertures. By way of example, they can comprise two or three dewatering apertures. However, it is also possible that the screw-based machines have very many more dewatering apertures, for example up to 30.

The location of the dewatering apertures can be on the upper side of the casing of the screw-based machine. However they can also have a lateral or downward-facing arrangement. It is also possible by way of example to arrange the dewatering apertures in laterally opposite pairs, or in pairs located above and below. It is moreover possible to use a combination of the arrangements mentioned. The arrangement can by way of example have each dewatering aperture alongside another or above another. It is also possible, however, that the arrangement has a plurality of dewatering apertures alongside one another or above one another.

The number and positioning of the dewatering apertures depend on the respective tasks. The dewatering generally takes place in the direction of conveying, in the direction of flow from the feed zone, or from the feed zone and the homogenizing zone, i.e. forwards. However, the dewatering can also take place against the direction of conveying, against the direction of flow, i.e. backwards toward the feed zone. In the simplest case there is only one dewatering aperture present, the arrangement of which can be upstream or downstream of a feed zone. If there are a plurality of feed zones, the dewatering can take place upstream or downstream of each of these feed zones.

The dewatering apertures can be of a design known per se, and can correspond in their geometry to known apertures of the type usually used for the removal of gaseous substances from an extruder. It is therefore possible to use dewatering apertures which are recesses and/or holes in the extruder barrel. Examples of suitable dewatering apertures are circular holes and holes in the form of a horizontal figure of eight (i.e. two circular holes directly alongside one another), where the arrangement of the longitudinal axis of the horizontal figure of eight can by way of example be at right angles (perpendicular) or parallel (longitudinal) to the direction of conveying of the extruder.

Another preferred embodiment of the dewatering apertures is rectangular, square, or oval, lateral, above, or below. The design of the square or rectangular apertures here can have rounded-off corners. Insofar as more than one dewatering aperture is used, it is also possible that these have differing geometry.

It is particularly preferable that the arrangement of the rectangular or oval dewatering apertures is such that the longer side of these is parallel to the axis of the extruder. If the dewatering apertures are above or below, in one embodiment the apertures extend over all of the screws, for example over both screws of a twin-screw machine, in such a way that both screws would be visible. It is also possible, however, that one of the screws is entirely or to some extent covered, in such a way that only one side is dewatered. Alternatively, the arrangement of the dewatering aperture can be such that it is not in close contact, so that although all of the screws are dewatered the water is conducted away only by way of the screw that is not covered. A cylindrically circumferential arrangement of the dewatering aperture is also possible, insofar as the pressure conditions permit this.

It is preferable in the invention that at least one dewatering aperture is equipped with a metal-wire-mesh composite sheet (MC), a finely perforated metal sheet, and/or a slit diaphragm. Particular preference is given among these to the MC.

In one preferred embodiment the pressure in the screw-based extruder in the region of the metal-wire-mesh composite sheets (MC) is from 10 bar to 55 bar, in particular from 15 bar to 35 bar. The usual pressure-measurement equipment is used to measure the pressure; the measurement can be based on direct measurement of the mechanical pressure, or on measurement of the pressure exerted onto a membrane, a piezoelement, a sensor, or other conventional components of the type used by the person skilled in the art in industrial pressure measurement.

The dewatering apertures can be operated under atmospheric pressure, under vacuum, or under superatmospheric pressure, and all of the dewatering apertures here can be subject to identical or different pressure. Appropriate pressure increase or vacuum can be used to adjust the moisture content of the extrusion material within certain limits here. In the case of a vacuum, the absolute pressure is usually from 2 mbar to 900 mbar, preferably from 10 mbar to 800 mbar, particularly preferably from 30 mbar to 500 mbar; in the case of devolatilization under superatmospheric pressure the absolute pressure is generally adjusted to from 1.1 bar to 20 bar. It is preferable however to operate the vent zones under atmospheric pressure or under vacuum.

The device has at least one dewatering aperture, equipped with a metal-wire-mesh composite sheet (MC), a finely perforated metal sheet, and/or a slit diaphragm. One embodiment has all of the dewatering apertures thus equipped.

Another preferred embodiment has some dewatering apertures thus equipped and the remainder of the dewatering apertures either open or provided with other devices which prevent escape of the product to be conveyed. By way of example, a retention screw can respectively serve this purpose: the dewatering aperture(s) at which the velocity of liquid discharge is greatest can be equipped with an MC, a finely perforated metal sheet, or a slit diaphragm, whereas the dewatering aperture(s) at which there is only little escape of product to be conveyed can be open. It can also be advantageous to provide an MC, a finely perforated metal sheet, or a slit diaphragm to the dewatering apertures at which the process generates high pressures, there being a pressure-retention system provided at the discharge side of the respective device mentioned.

It is preferable that the geometry of the MC, the finely perforated metal sheet or the slit diaphragm is appropriate to that of the dewatering aperture: it can be circular, or have the shape of a horizontal figure of eight, or be rectangular, square, or oval.

The MC, the finely perforated metal sheet, or the slit diaphragm can be secured within the dewatering aperture in a very wide variety of ways. It is preferable that the respective device mentioned is welded, soldered, or inserted under pressure into a stable frame. The frame can then be clamped, or inserted under pressure, or inserted with use of a screw thread into appropriate cutouts of a cramp within the dewatering aperture. Attachment by a hinge is also possible, and here one side of the frame is equipped with a securely attached hinge or a comparable device. A variable attachment, for example permitting use of a hinge, permitting insertion under pressure, permitting screw attachment or click-in attachment, by means of a bayonet seal has the advantage that appropriately prefabricated frames can be interchanged rapidly. This makes it easier to clean, maintain, or inspect the system, and also makes it easier to adapt a machine as required by, for example, product changeover.

The manner of attachment of the MC, the finely perforated metal sheet, or the slit diaphragm within the dewatering aperture can be such that one surface forms a level end surface with the internal wall of the extruder barrel. The extent to which the surface of the MC, finely perforated metal sheet, or slit diaphragm protrudes into the extruder interior is generally not more than the gap between screw and wall. This prevents damage to the screw and to the MC, the finely perforated metal sheet or the slit diaphragm. Another advantage of this type of design is that it prevents formation of deposits on the MC, the finely perforated metal sheet or the slit diaphragm, or continual adhesion of extrusion material onto the system.

In another embodiment it can be advantageous to attach the MC, the finely perforated metal sheet, or the slit diaphragm with a degree of recessing away from the screw. This avoids mechanical contact between screw and MC, finely perforated metal sheet, or slit diaphragm. However, with this type of attachment it can be necessary to ensure that no deposits of residues of extrusion material form within the dead spaces present. Recessed attachment can be particularly advantageous when by way of example the location of the dewatering aperture is apical, and in particular in the metering region, and pulverulent extrusion material is present. Provision of some degree of space for this material during dewatering allows it to fall back into the screw flight.

Insofar as the surface of the MC, of the finely perforated metal sheet, or of the slit diaphragm forms a level surface with the internal side of the extruder barrel, it preferably has the same curvature as the extruder barrel. However, it is also possible that the surface of the MC, of the finely perforated metal sheet, or of the slit diaphragm has a different curvature:

It can be advantageous that the surface has a concave or convex curvature, or is entirely flat. In one particularly preferred embodiment its curvature corresponds to that of the screw, thus allowing the screw to follow the curvature of the surface whilst combing same at regular intervals. If the position of the dewatering aperture is in the region of the interstice between two screws it can by way of example be advantageous or necessary to adapt the shape of the surface so that it corresponds to a longitudinally sectioned horizontal figure of eight.

In one preferred embodiment the MC has from 2 to 30 layers, in particular from 3 to 15 layers.

The MC can have a wire mesh which by way of example is smooth or has plane-woven structure. It is possible that the wire mesh has a square mesh shape or has a twill-weave structure. However, it may also be a smooth- or plane-woven braid mesh, or a twilled braid or reinforced braid. Wire meshes with a multilayer structure made of two or three, or more, layers, for example up to 30 layers, preferably from 2 to 10 layers, have very good mechanical stability and are therefore preferred. Preference is given here to MC which have a coarsely woven backing layer which has a coarse mesh but is mechanically stable (support mesh), on which there is a structure of intermediate layers and filter layers of increasingly narrow mesh with increasingly fine-woven structure. In one preferred embodiment the average mesh width of the smallest-mesh layer of the metal-wire-mesh composite sheet (MC) is from 1 μm to 500 μm, preferably 10 μm to 200 μm, particularly preferably from 50 μm to 100 μm, and in particular 75 μm.

The mesh widths for the finest or smallest mesh can by way of example be from 1 μm to 500 μm, preferably from 10 μm to 200 μm, particularly preferably from 50 μm to 100 μm, and in particular 75 μm.

The mesh widths of the backing layer are generally markedly higher than that, and can be up to a number of millimeters. Smaller mesh widths for the finest mesh are likewise possible, for example when the intention is to retain particularly fine particles. It is also possible that the type of weave is identical for some layers and then changes, or that it changes from layer to layer. The type of weave and the number of layers depend on the particular task, in particular on the mechanical strength required, the pressure conditions, or the separation task.

In order to increase the mechanical strength of the MC, the individual wire meshes may have been sintered to one another. This embodiment is preferred. MC are known per se and are by way of example available commercially for melt filtration purposes or as bases to accept the flow in fluidized-bed reactors. However, they may also be manufactured from parts known per se.

The finely perforated metal sheets that can be used in the invention are finely perforated metal sheets with hole widths of, for example, 0.06 mm to 4 mm.

They can also be combined with a wire mesh of the type stated above, the finely perforated metal sheet generally serving as backing material and the wire mesh serving as filter material. However, the opposite is also possible: a coarse wire mesh used as backing and a very finely perforated metal sheet used as filter layer. Finely perforated metal sheets are known per se and are used in the prior art for screening centrifuges and other centrifuges.

Slit diaphragms which can be used in the invention have apertures in the form of slits and differ from strainer cages in particular in not having continuous slits but having a large number of discrete apertures. The arrangement of these apertures can in principle be at any angle to the screw axis, for example parallel to the axis of the screw. However, the apertures may also run in any other direction with respect to the axis of the screw(s). In one of the preferred embodiments, the apertures of the slit diaphragm are not parallel to the axis of the screw, and in particular they run in a direction at 90° to the axis of the screw(s). The sizes of the apertures may be uniform. However, their sizes may also vary.

The ratio of the length of the longer and shorter axes of the apertures can by way of example be in the range from 60:1 to 2:1, preferably from 50:1 to 4:1. The length of the shorter of the axes of the apertures can by way of example be from 0.05 to 0.1 mm, preferably from 0.05 to 0.09 mm. In the case of multilayer slit diaphragms the length of the shorter axis of the apertures can also be longer, for example up to 0.5 mm, where slit diaphragms with these larger apertures preferably have the layer(s) with the larger apertures on the side facing away from the material being conveyed. Slit diaphragms of this type are known per se and are used in the prior art in screening centrifuges, other centrifuges, and fluidized-bed driers.

The materials used to manufacture MC, finely perforated metal sheet, or slit diaphragm depend on the intended use. They are generally zinc- or tin-coated non-alloy steels, NiC(-carbon) steels, Cr steels, stainless steels, such as martensitic or austenitic steels of material groups 1.43 (CrNi steels) or 1.44 (CrNiMo steels). However, it is also possible to use high-temperature-resistant steels, or steels derived from alloys with copper, with nickel, with titanium or with aluminum. For extruding natural materials for the food sector or for extrusion in the medical sector, it may be necessary to use precious metal such as silver. It is also possible to use polished, in particular smooth to mirror-smooth metallic materials. Other possible metallic surfaces are those exhibiting what is known as the lotus effect. For exceptional cases in the low-temperature sector it is also possible to use plastics. Material groups 1.40 to 1.45 can cover most applications, and among these it is chromium-nickel-molybdenum steels which are most frequently used.

Use of MC, finely perforated metal sheet, or slit diaphragm is very effective in retaining fine solid particles, the result being that in essence the only material that escapes is gas, for example water vapor, or liquid. The MC, the finely perforated metal sheet, or the slit diaphragm may be cleaned simply by backwashing, brush cleaning, or burn-cleaning, since there is generally in essence no contamination by material at the depth within the layers of the mesh.

In one preferred embodiment the screw-based extruder (S) is equipped with at least two co- or contrarotating screws with diameter (Ds) from 30 mm to 230 mm, in particular from 60 mm to 220 mm.

In one particularly preferred embodiment the device for carrying out the process of the invention is an extruder with at least two corotating or contrarotating screws, where the extruder consists essentially in the direction of conveying (in the direction of flow) of—at least one feed zone (FZ) where a thermoplastic molding composition comprising water is introduced by means of feed equipment into the extruder,—at least one squeeze zone (SZ) which serves to dewater the thermoplastic molding composition, which comprises at least one baffle, and which also comprises in each case at least one associated dewatering aperture equipped with an MC, a finely perforated metal sheet, or a slit diaphragm,—at least one input zone (IZ) where other components of the thermoplastic molding composition in the form of melt are introduced into the extruder,—at least one plastifying zone (PZ) provided with mixing, kneading, and/or other plastifying elements,—at least one vent zone (VZ) which has at least one vent and in which further water is removed from the thermoplastic molding composition as vapor, where at least one of the vents is often equipped with an MC, a finely perforated metal sheet, or a slit diaphragm, and—a metering zone (MZ).

The device for carrying out the process of the invention can be used to extrude a thermoplastic molding composition which can be devolatilized and at the same time dewatered. It is also possible to introduce, into the device, a mixture of water and a thermoplastic molding composition, for example a slurry of thermoplastic molding composition in water, and to extrude same. In this case the water content of the thermoplastic molding composition is by way of example up to 90% by weight. It is equally possible to extrude a mixture of different thermoplastic molding compositions. It is also possible in the invention that the device serves to produce a thermoplastic molding composition from a component comprising water, comprising up to 60% by weight of residual water, in that said component is introduced into the device, and mixed in at least to some extent dewatered form with other components, and the thermoplastic molding composition is then discharged. This method is preferably used to produce impact-modified thermoplastic molding compositions or impact-modified polymer blends comprising thermoplastics.

In one preferred embodiment at least one step of the process of the invention comprises devolatilization and/or mechanical dewatering, where the water that emerges is to some extent or entirely removed in the liquid phase. The water temperature at the discharge aperture is generally from 40° C. to 130° C., preferably 50° C. to 99° C., but under pressure can also be higher.

In another preferred embodiment the thermoplastic molding composition is produced from a thermoplastic molding composition comprising water, comprising up to 90% by weight of residual water, and said composition is optionally mixed with the other components with devolatilization and dewatering, and then the thermoplastic molding composition is discharged from the extruder.

A first squeeze zone removes a quantity of the residual water initially comprised, said quantity usually being from 10% by weight to 90% by weight, preferably from 20% by weight to 80% by weight and being dependent on an elastomer component of the thermoplastic molding composition and on the residual water content initially present.

In one preferred embodiment the feed zones and squeeze zones of the extruder are not heated. In one embodiment these zones of the extruder are cooled.

In one embodiment preferred for the production of some impact-resistant thermoplastic molding compositions the first squeeze zone just described is followed by a second squeeze zone, which is in turn composed of a conveying zone and a restricted-flow zone acting as restriction. The description of this zone is in essence the same as that of the first squeeze zone, in particular in relation to the nature of the MC, finely perforated metal sheet, or slit diaphragm used.

The optional second squeeze zone achieves further dewatering of the elastomer component, where again up to 80% by weight, preferably up to 65% by weight, of the water initially comprised (before extrusion) is removed. The mechanical energy introduced via the rotating extruder screw generally increases the temperature of the elastomer component in the second squeeze zone to values up to 250° C.

The design of the process is preferably such as to minimize the temperatures to which the extruder contents are exposed. The design and operation of the extruder is therefore preferably such that the temperature of the elastomer component does not exceed 200° C., particularly 180° C. The temperatures mentioned are based on the restricted-flow zones.

From 20% by weight to 99% by weight of the water removed in the second squeeze zone is discharged as liquid, the balance of 100% by weight being discharged as vapor. However, the design of the dewatering apertures is preferably such that, despite the high temperature of the material, the proportion of the water that emerges in liquid form is 70% by weight or more. To this end, the geometries of the extruder screws and optionally of the retention screws are designed in such a way that, for example via increased pressure in the region of discharge or via other measures, the water remains predominantly liquid. It is also possible in the invention that the dewatering apertures in said squeeze zone are equipped with an MC, a finely perforated metal sheet, or a slit diaphragm. Any pressure retention that may be required is generally achieved in the discharge lines outside of the MC, the finely perforated metal sheet, or the slit diaphragm.

At the end of the second squeeze zone, the partially dewatered elastomer component can already have undergone a relatively large extent of (incipient) melting, and can take the form of relatively large molten agglomerates.

The extruder can comprise further squeeze zones behind the second squeeze zone, in particular when the initial residual water content of the elastomer component is high.

In one preferred embodiment the device for carrying out the process according to the invention for the production of impact-modified thermoplastic molding compositions or impact-modified polymer blends comprising thermoplastics can be used via mixing of at least one elastomer component A comprising water, comprising up to 90% by weight, preferably up to 60% by weight, of residual water, with at least one thermoplastic polymer B, and also with other polymers C, and additives D, in a screw-based machine with mechanical dewatering of elastomer component A.

In one preferred embodiment the diameter (Ds) of at least one screw of the screw-based extruder (S) is from 80 mm to 180 mm, and the rotation rate (RR) of the at least one screw of the screw-based extruder (S) is from 100 200 rpm to 200 rpm.

EP-A 1 400 337 provides a relatively detailed explanation of the principles of a process for the extrusion of thermoplastics. However, the preferred rotation rate range mentioned in the abovementioned document, from 100 min$^{-1}$ to 700 min$^{-1}$, with advantageous shear rates from 35 s$^{-1}$ to 260 s$^{-1}$, is unsuitable for establishing ideal processing conditions.

Elastomer component A used can be any polymer which has elastomeric properties and can be introduced into an extruder. It is also possible to use a mixture of various elastomer components A.

In particular, particulate rubbers are used as elastomer component A. Particular preference is given to those rubbers that have a grafted-on shell made of other polymers that are generally not elastomeric. In one preferred embodiment of the invention the types of graft rubber that are introduced as partially dewatered material into the extruder comprise up to 50% by weight of residual water, particularly preferably from 25% by weight to 40% by weight.

One embodiment of the invention consists in a process which uses, as elastomer component A, graft rubbers of two-stage or multistage structure where the elastomeric base stages or elastomeric graft stages are obtained via polymerization of one or more of the following monomers: butadiene, isoprene, chloroprene; styrene, alkylstyrene, C1- to C12-alkyl esters of acrylic acid or of methacrylic acid, and also small quantities of other monomers whose properties include crosslinking, where the hard graft stages are polymerized from one or more of the following monomers: styrene, alkylstyrene, acrylonitrile, methyl methacrylate.

Preference is given to graft particles A made of polymers based on butadiene/styrene/acrylonitrile, n-butyl acrylate/styrene/acrylonitrile, butadiene/n-butyl acrylate/styrene/acrylonitrile, n-butyl acrylate/methyl methacrylate, n-butyl acrylate/styrene/methyl methacrylate, butadiene/styrene/acrylonitrile/methyl methacrylate, butadiene/n-butyl acrylate/methyl methacrylate/styrene/acrylonitrile. Core or shell can comprise, within the polymer, up to 10% by weight of polar monomers bearing functional groups, or else crosslinking monomers.

Thermoplastic polymers B used in this embodiment are styrene-acrylonitrile (SAN) copolymers, polystyrene, polymethyl methacrylate, polyvinyl chloride, and mixtures of said polymers.

Preference is given to SAN polymers, polymethyl methacrylate (PMMA), and mixtures of said polymers. Other thermoplastic polymers B that can also be used are polycarbonates, polyalkylene terephthalates such as polybutylene terephthalate and polyethylene terephthalate, polyoxymethylene, polymethyl methacrylate, polyphenyl sulfide, polysulfones, polyether sulfones, and polyamides, and mixtures of these thermoplastics. It is moreover also possible to use thermoplastic elastomers such as thermoplastic polyurethane (TPU) as polymer B.

Materials that can equally be used as component B are copolymers based on styrene/maleic anhydride, on styrene/imidated maleic anhydride, on styrene/maleic anhydride/imidated maleic anhydride, on styrene/methyl methacrylate/imidated maleic anhydride, on styrene/methyl methacrylate, on styrene/methyl methacrylate/maleic anhydride, on methyl methacrylate/imidated maleic anhydride, on styrene/imidated methyl methacrylate, on imidated PMMA, and mixtures of these polymers.

In all of the thermoplastic polymers B mentioned the styrene can be replaced entirely or to some extent by alpha-methylstyrene, or by ring-alkylated styrenes, or by acrylonitrile. Among the latter polymers B, preference is given to those based on alpha-methylstyrene/acrylonitrile, styrene/maleic anhydride, styrene/methyl methacrylate, and copolymers with imidated maleic anhydride.

Known examples of elastomer component A are polymers of conjugated dienes such as butadiene with an outer graft shell based on a vinylaromatic compound, for example SAN copolymers. Equally, there are known graft rubbers based on crosslinked polymers of C1- to C12-alkyl esters of acrylic acid such as n-butyl acrylate, ethylhexyl acrylate, grafted with polymers based on vinylaromatic compounds such as SAN copolymers. Other familiar materials are graft rubbers which in essence comprise a copolymer, of conjugated dienes and C1- to C12-alkyl acrylates, for example a butadiene-n-butyl acrylate copolymer, and an outer graft stage made of SAN copolymer, polystyrene, or PMMA. The production of these graft rubbers by the conventional processes, in particular via emulsion polymerization or suspension polymerization, is known.

Graft rubbers based on SAN-grafted polybutadiene are described by way of example in the specifications DE 24 27 960 and EP-A 258 741, and graft rubbers based on SAN-grafted poly-n-butyl acrylate are described by way of example in DE-B 12 60 135 and DE-A 31 49 358. EP-A 62 901 provides further details relating to SAN-grafted poly (butadiene/n-butyl acrylate) mixed rubbers.

In the case of the graft rubbers mentioned in the last paragraph, copolymers of styrene and acrylonitrile are used as thermoplastic polymers B. They are known and to some extent also commercially available, and their intrinsic viscosity IV (determined in accordance with DIN 53 726 at 25° C., 0.5% by weight in dimethylformamide) is generally from 40 ml/g to 160 ml/g, corresponding to an average molar mass Mw of about 40 000 g/mol to 2 000 000 g/mol.

The thermoplastic polymers B are preferably produced via continuous bulk polymerization or continuous solution polymerization, where the resultant melt, optionally after removal of the solvents, is by way of example introduced continuously directly into the extruder by using a melt pump. However, production via emulsion polymerization, suspension polymerization, or precipitation polymerization is also possible, where the polymer is separated from the liquid phase in an additional operation. Details of the production processes are described by way of example in Kunststoffhandbuch [Plastics handbook], ed. R. Vieweg and G. Daumiller, vol. V "Polystyrol" [Polystyrene], Carl-Hanser-Verlag, Munich, 1969, p. 118 to p. 124.

If elastomer component A is an SAN-grafted polybutadiene, incorporation of the SAN produces a molding composition known as ABS (acrylonitrile/buta-diene/styrene). If an SAN-grafted alkyl acrylate is used as elastomer component A, the materials known as ASA molding compositions (acrylonitrile/styrene/acrylate) are produced.

Another embodiment uses graft rubbers with up to 60% by weight residual water content based on polydienes and/or on polyalkyl acrylates, and also SAN and/or PMMA, these being composed of more than two graft stages. Examples of these multistage graft particles are particles which comprise a polydiene and/or polyalkyl acrylate as core, a polystyrene or SAN polymer as first shell, and another SAN polymer with a different styrene:acrylonitrile ratio by weight as second shell, or else particles made of a polystyrene core, polymethyl methacrylate core, or SAN polymer core, a first shell made of polydiene and/or polyalkyl acrylate, and a second shell made of polystyrene, polymethyl methacrylate, or SAN polymer. Other examples are graft rubbers made of a polydiene core, one or more polyalkyl acrylate shells, and one or more polymer shells made of polystyrene, polymethyl methacrylate, or SAN polymer, and similarly constructed graft rubbers with acrylate core and polydiene shells.

Other familiar copolymers have multistage core-shell structure made of crosslinked alkyl acrylate, styrene, methyl methacrylate, and an outer shell made of PMMA. These multistage graft rubbers are described by way of example in DE-A 31 49 046. Graft rubbers based on n-butyl acrylate/styrene/methyl methacrylate with a shell made of PMMA are described by way of example in EP-A 512 333, and any other structure that corresponds to the prior art for these graft rubbers is also possible here. Rubbers of this type are used as impact-modifying component for polyvinyl chloride, and preferably for impact-resistant PMMA.

Thermoplastic polymers B used are in turn preferably the SAN copolymers mentioned and/or PMMA. If elastomer component A is a multishell core/shell polymer based on n-butyl acrylate/methyl methacrylate, and the polymer B is PMMA, the result is accordingly impact-resistant PMMA.

The diameter of the particulate graft rubbers is from 0.05 to 20 micrometers. If the materials are the well-known small-diameter graft rubbers, the diameter is preferably from 80 nm to 600 nm, and particularly preferably from 100 nm to 600 nm.

In the case of the large-particle graft rubbers advantageously produced by means of suspension polymerization the diameter is preferably from 1.8 micrometers to 18 micrometers, and in particular from 2 micrometers to 15 micrometers. DE-A 44 43 886 by way of example teaches large-diameter graft rubbers of this type. Again in this embodiment the SAN copolymers mentioned, polystyrene and/or PMMA are preferred as component B.

Component C is other polymers, in particular thermoplastic polymers. Component C used can be any of the polymers mentioned for the thermoplastic polymer B. The polymers B and C generally differ in the monomers used.

If the monomers of which the polymers B and C are composed are identical, components B and C generally differ in the quantitative proportions of the monomers—by way of example the polymers B and C can be styrene-acrylonitrile copolymers which differ in styrene:acrylonitrile ratio. In the event that the quantitative proportions of the monomers are also identical, the polymers B and C differ in their average molar masses Mw (B) and Mw (C), measurable by way of example as different intrinsic viscosities IV (B) and IV (C).

Monomers that can be used for the production of C are not only the monomers styrene, acrylonitrile, methyl methacrylate, and vinyl chloride mentioned inter alia for component B but also the following other compounds as substantial constituents:—α-methylstyrene and C1- to C8-ring-alkylated styrenes and, respectively, α-methylstyrenes,—methylacrylonitrile,—C1- to C12-alkyl esters of acrylic acid and of methacrylic acid,—maleic acid, maleic anhydride, and also maleimides,—vinyl ethers, vinylformamide.

Examples that may be mentioned for component C are polymers based on α-methylstyrene/acrylonitrile and methyl methacrylate/alkyl acrylate, and also copolymers of alkyl esters of acrylic acid or of methacrylic acid and styrene and, respectively, acrylonitrile, and, respectively, styrene and acrylonitrile.

Other preferred polymers C are—styrene-acrylonitrile copolymers where quantitative proportions of the monomers differ from those of component B, or where average molar masses Mw of the copolymers differ. Mw is determined by familiar methods.

Copolymers of α-methylstyrene and acrylonitrile, αpolymethyl methacrylates, αpolycarbonates, polybutylene terephthalate and polyethylene terephthalate,—polyamides,—copolymers of at least two of the monomers styrene, methyl methacrylate, maleic anhydride, acrylonitrile, and maleimides, for example copolymers of styrene, maleic anhydride, and phenylmaleimide, and ABS produced by means of bulk polymerization or solution polymerization,—thermoplastic polyurethanes (TPU). The production of these polymers is known to a person skilled in the art, and only brief details thereof are therefore given below.

The expression polymethyl methacrylates in particular means polymethyl methacrylate (PMMA), and also copolymers based on methyl methacrylate with up to 40% by weight of other copolymerizable monomers, for example those obtainable as Plexiglas from Evonik. Merely by way of example, mention may be made of a copolymer of 98% by weight of methyl methacrylate and 2% by weight of methyl acrylate as comonomer (Plexiglas 8N, Evonik). Equally suitable is a copolymer of methyl methacrylate with styrene and maleic anhydride as comonomers (Plexiglas HW55, Evonik).

Suitable polycarbonates are known per se. They are by way of example obtainable by methods corresponding to the processes of DE-B-1 300 266 via interfacial polycondensation, or by the process of DE-A-14 95 730 via reaction of biphenyl carbonate with bisphenols.

Preferred bisphenol is 2,2-di(4-hydroxyphenyl)propane, generally termed bisphenol A. It is also possible to use other aromatic dihydroxy compounds instead of bisphenol A, in particular 2,2-di(4-hydroxy-phenyl)pentane, 2,6-dihydroxynaphthalene, 4,4'-dihydroxydiphenyl sulfone, 4,4'-dihydroxydiphenyl ether, 4,4'-dihydroxydiphenyl sulfite, 4,4'-dihydroxydiphenylmethane, 1,1-di(4-hydroxyphenyl)ethane, or 4,4-dihydroxydiphenyl and also mixtures of the abovementioned dihydroxy compounds.

Particularly preferred polycarbonates are those based on bisphenol A or bisphenol A together with up to 30 mol % of the abovementioned aromatic dihydroxy compounds. Polycarbonates are obtainable by way of example with the trademarks Makrolon (Bayer), Lexan (SABIC IP), Panlite (Tejin), or Calibre (Dow). The relative viscosity of these polycarbonates is generally in the range from 1.1 to 1.5, in particular from 1.28 to 1.4 (measured at 25° C. in 0.5% by weight solution in dichloromethane).

Polybutylene terephthalate and polyethylene terephthalate are generally produced in a manner known per se via condensation of terephthalic acid and, respectively, esters thereof with butanediol and, respectively, ethanediol, with catalysis. This condensation is advantageously carried out in two stages (precondensation and polycondensation). Details are obtainable by way of example from Ullmann's Encyclopadie der Technischen Chemie [Ullmann's Encyclopedia of Industrial Chemistry], 4th edn, vol. 19, pp. 61-88. Polybutylene terephthalate is by way of example obtained commercially as Ultradur (BASF).

Preferred polyamides are very generally those with aliphatic semicrystalline or semiaromatic, or else amorphous structure of any type, and blends of these. Products of this type are obtainable by way of example with the trademark Ultramid (BASF). Thermoplastic polyurethanes are usually produced via reaction of organic, preferably aromatic diisocyanates, for example diphenylmethane 4,4'-diisocyanate, with polyhydroxy compounds which are preferably in essence linear, for example polyetherols, or polyesterols such as polyalkylene glycol polyadipates, and diols acting as chain extenders, for example butane-1,4-diol, in the presence of catalysts such as tertiary amines (for example triethylamine) or organometallic compounds. The ratio of NCO groups of the diisocyanates to the entirety of the OH groups (from the polyhydroxy compounds and the chain-extending diols) here is preferably about 1:1.

It is preferable that the TPU are produced by what is known as the belt process in which the components mentioned and the catalyst are mixed continuously by means of a mixing head, and the reaction mixture is applied to a conveyor belt. The belt passes through a zone with the temperature controlled to from 60° C. to 200° C., where the mixture completes its reaction and solidifies. Details relating to the TPU are obtainable by way of example from EP-A 443 432. TPU are by way of example obtainable with the trademark Elastollan (Elastogran).

Component C can moreover consist essentially of copolymers of C2- to C9-alkenes such as ethylene, propene, and butene with—vinylaromatics,—polar comonomers such as acrylic acid and methacrylic acid, the C1- to C12-alkyl esters of acrylic acid and of methacrylic acid,—other mono- or polyfunctional ethylenically unsaturated acids such as maleic acid, maleic anhydride, fumaric acid, itaconic acid, and also esters thereof, in particular glycidyl esters, esters with C1- to C9-alkanols, and esters with aryl-substituted C1- to C9-alkanols,—carbon monoxide,—nonaromatic vinyl compounds such as vinyl acetate, vinyl propionate, and vinyl alkyl ethers,—basic monomers such as hydroxyethyl acrylate, dimethylaminoethyl acrylate, vinylcarbazole, vinylaniline, vinylcaprolactam, vinylpyrrolidone, vinylimidazole, and vinylformamide,—acrylonitrile, methacrylonitrile, these being produced in a well-known manner.

In one preferred embodiment a polymer C is used which can be produced from 40% by weight to 75% by weight of ethylene, from 5% by weight to 20% by weight of carbon monoxide, and from 20% by weight to 40% by weight of n-butyl acrylate (obtainable as Elvaloy E HP-4051 (DuPont)), or a polymer which can be produced from 50% by weight to 98.9% by weight of ethylene, from 1% by weight to 45% by weight of n-butyl acrylate, and from 0.1% by weight to 20% by weight of one or more compounds selected from the group of acrylic acid, methacrylic acid, and maleic anhydride. The latter embodiments are usually produced via free-radical polymerization, as described in the specifications U.S. Pat. No. 2,897,183 and U.S. Pat. No. 5,057,593.

Copolymers of butadiene or substituted butadienes with styrene, methyl methacrylate, or acrylonitrile are moreover suitable, an example being nitrile rubber (NBR) or styrene-butadiene rubber (SBR). The olefinic double bonds in these copolymers can have been entirely or to some extent hydrogenated.

Materials likewise suitable as component C are optionally hydrogenated or partially hydrogenated copolymers of butadiene and styrene with block structures. They are preferably produced by the anionic polymerization method in solution using organometallic compounds such as sec-butyllithium, producing linear block rubbers by way of example with styrene/butadiene (two-block) structure or styrene/butadiene/styrene (three-block) structure.

These blocks can be separated from one another by polymers with random distribution, and the blocks can also moreover comprise subordinate quantities of units of the respective other monomer.

When small quantities of an ether, in particular tetrahydrofuran (THF), are used concomitantly alongside the initiator, polymer chains are produced which, starting from a butadiene-rich segment at the beginning, have increasing styrene content along the chain, and finally terminate in a homopolystyrene segment. Details of the production process are described in DE-A 31 06 959. Optionally hydrogenated or partially hydrogenated polymers C having this type of structure also have good suitability.

Materials likewise having good suitability as component C are polymers with star-shaped structure which are obtained via linking of a plurality of polymer chains, primarily of three-block polymers of styrene/butadiene/styrene type, by way of polyfunctional molecules. Examples of suitable linking agents are polyepoxides, for example epoxidized linseed oil, polyisocyanates such as 1,2,4-triiso-cyanatobenzene, polyketones such as 1,3,6-hexanetrione, and polyanhydrides, and moreover dicarboxylic esters such as diethyl adipate, and also silicon halides such as $SiCl_4$, metal halides such as $TiCl_4$, and polyvinylaromatics such as divinylbenzenes. Further details concerning the production of these polymers is obtainable by way of example from DE-A 26 10 068.

The thermoplastic molding compositions produced by the process of the invention can comprise, as further component D alongside elastomer component A and the polymers B and C, additives, for example waxes, plasticizers, lubricants and mold-release agents, pigments, dyes, matting agents, flame retardants, antioxidants, stabilizers to counter the effect of light and of thermal degradation, fibrous and pulverulent fillers and fibrous and pulverulent reinforcing materials, and antistats, in the quantities conventional for these materials.

The additives D can, in pure form, take the form of solid, liquid, or gas, or can be used in the form of a mixture of the pure substances. They can equally be used in a formulation which facilitates metering, for example in the form of solution or in the form of dispersion (emulsion or suspension). Formulation as masterbatch, i.e. as concentrated mixture with a thermoplastic polymer compatible with the extruder contents, is also suitable and in some cases preferred.

The polymers C and the additives D can be introduced into the extruder in one or more of the extruder zones mentioned. In one preferred embodiment components C and D are introduced into the extruder—separately from elastomer component A and the thermoplastic polymer B—in the deaeration zone (DZ), in the feed zone (FZ), and/or in the input zone (IZ) where the polymer B is introduced into the extruder. In another preferred embodiment component C and/or D is introduced into the extruder in the metering zone (MZ).

The constituents C and D can be metered into the same zone(s), or respectively into different extruder zones, and in the case of both C and D it is possible to introduce 100% to the extruder of the material in one zone or to divide the introduction over a plurality of zones.

The precise manner of introduction of C and D is dependent on the physical and chemical properties mentioned of components A to D, and the quantitative proportions thereof: by way of example it is possible to delay introduction of additives D with low thermal stability into the extruder until the metering zone (MZ) has been reached, thus substantially preventing any thermal degradation of the substances D.

The thermoplastic molding compositions produced in the process can be processed by the conventional processes to give moldings. Mention may be made by way of example of extrusion (for pipes, profiles, fibers, films, and sheets), injection molding (for moldings of any type), and also calendering and rolling (for sheets and films).

A substantial advantage of the process of the invention is that in essence no fine particles escape from the extruder by way of the vents and/or dewatering apertures.

The device of the invention is moreover technically considerably simpler than the known devices. In comparison with the devices known from the prior art, the processes of the invention moreover have the advantage of substantially simpler operation, thus permitting very rapid cleaning and changeover.

In one embodiment the process of the invention is used to produce thermoplastic molding compositions characterized by less than 50 ppm 1-butene content, preferably less than 20 ppm, based on the total mass of the thermoplastic molding composition.

In one preferred embodiment the thermoplastic molding composition produced by the process of the invention comprises a butyl acrylate-styrene-acrylonitrile copolymer, and also an SAN copolymer, and optionally other components, and is characterized by less than 20 ppm 1-butene content, preferably less than 10 ppm, based on the total mass of the thermoplastic molding composition.

The process of the invention can produce thermoplastic molding compositions which in particular comprise a butyl acrylate-styrene-acrylonitrile copolymer, and also an SAN copolymer, and optionally other components, where these have less than 50 ppm 1-butene content, preferably less than 20 ppm, and with particular preference less than 10 ppm, based on the total mass of the thermoplastic molding composition. Thermoplastic molding compositions which have been produced in the invention moreover generally have low content of residual monomers and degradation products: by way of example styrene content is typically less than 39 ppm, preferably less than 25 ppm and with particular preference less than 20 ppm, based on the total mass of the thermoplastic molding composition. The invention is illustrated with the aid of a figure (FIG. 1) which shows an embodiment and does not represent any restriction in relation to other possible embodiments.

The figure FIG. 1 is a diagram of the extruder. FIG. 1 shows the arrangement of the feed zone (FZ), the squeeze zone (SZ), the input zone (IZ), the plastifying zone (PZ), the vent zone (VZ), and the metering zone (MZ) in the extruder which is used for the mechanical dewatering of the elastomer A and for mixing with the thermoplastic B. A is added in (FZ), whereas B is introduced in (IZ). The squeeze zone (SZ) of the screw-based extruder has the screw diameter (Ds), and also the screw rotation rate (RR). There is moreover a metal-wire-mesh composite sheet (MC) incorporated in the squeeze zone (SZ).

The examples and the claims provide further explanation of the invention.

COMPARATIVE EXAMPLE AND INVENTIVE EXAMPLE

The comparative example and inventive example compare the resultant content of degradation products in the product at high and low rotation rates (RR) of the extruder screw and also with and without use of a metal-wire-mesh composite sheet (MC) in the squeeze zone (SZ).

| | Comparative example | Inventive example |
|---|---|---|
| Extruder | ZSK133 with Ds = 133 mm | ZSK133 with Ds = 133 mm |
| Zone FZ, Feed zone | Conveying elements | Conveying elements |
| Zone SZ1, Squeeze zone | Baffles/conveying element + retention screw | Baffles/conveying elements + retention screw |
| Zone SZ2, Squeeze zone | Baffles/conveying element + retention screw | Baffles/conveying element + metal-wire-mesh composite sheet |
| Zone IZ, SAN input | Mixing elements | Mixing elements |
| rpm in SZ2 | 270 | 160 |
| Pressure in SZ2 | 57 bar | 32 bar |
| Throughput of rubber* | 1.1 t/h | 1.1 t/h |
| Throughput of SAN polymer* | 1.1 t/h | 1.1 t/h |
| Degradation products in compounded ASA polymer in | | |
| ppm of 1-butene | 51 | 6 |
| ppm of residual styrene | 39 | 16 |

*ASA rubber and SAN polymer as described in EP-A 1 400 337;
Quantity of rubber based on dry rubber The mesh width of the metal-wire-mesh composite sheet (MC) used in squeeze zone SZ2 in the inventive example is 75 μm. 1-Butene content in the compounded ASA polymer was determined by weighing 0.5 g of a sample into a 22 ml headspace ampoule. The sample is heated at 80° C. for 3 hours. The volatile constituents are then quantified by headspace GC analysis.

The specific use of a metal-wire-mesh composite sheet (MC), and the reduction of the screw rotation rate (RR) from 270 to 160 rpm permitted processing of the molding compositions under less aggressive conditions. This can be discerned inter alia from the content of degradation products of the thermoplastic molding composition. In the inventive example the undesired content of the degradation product of 1-butene is reduced from 51 ppm to 6 ppm, and the content of residual monomer styrene is reduced from 39 ppm to 16 ppm.

The (thermoplastic molding) compositions obtained can be processed with better results and lead to higher-specification moldings.

What is claimed is:

1. A process for the production of thermoplastic molding compositions, where an extruder is used which consists essentially of the following, in the direction of conveying (in the direction of flow):
    a) at least one feed zone (DA) where a thermoplastic molding composition comprising water is introduced by means of feed equipment into the extruder, where said feed zone (DA) optionally comprises at least one dewatering aperture equipped with a metal-wire-mesh composite sheet (MV), a finely perforated metal sheet, or a slit diaphragm,
    b) at least one squeeze zone (Q) which serves to dewater the thermoplastic molding composition, which comprises at least one baffle, and which also comprises in each case at least one associated dewatering aperture, said at least one dewatering aperture being equipped with a metal-wire-mesh composite sheet (MV), a finely perforated metal sheet, or a slit diaphragm,
    c) at least one input zone (Z) where other components of the thermoplastic molding composition in the form of melt are introduced into the extruder,
    d) at least one plastifying zone (P) provided with mixing and/or kneading elements,
    e) at least one vent zone (E) which has at least one vent and in which further water or liquids are removed from the thermoplastic molding composition as vapor, where at least one of the vents is preferably equipped with a metal-wire-mesh composite sheet (MV), a finely perforated metal sheet, or a slit diaphragm, and
    f) a metering zone (AT) at which the thermoplastic molding composition is discharged from the extruder,
    where the squeeze zone (Q) in the process uses a screw-based extruder (S) in which the diameter (Ds) of at least one screw is from 30 to 230 mm, and
    where the rotation rate (DZ) of the at least one screw of the extruder is from 60 to 270 rpm, and where
    the screw-based extruder (S) used has at least one vent and/or dewatering aperture where there is, secured in the dewatering aperture, at least one metal-wire-mesh composite sheet (MV), with two or more layers, there being at least one smaller-mesh layer present on a coarsely woven, large-mesh but mechanically stable backing layer (first layer), where the location of the layer having the smallest mesh is on a side facing toward the product, and
    where the thermoplastic molding composition comprises at least one rubber-modified styrene-acrylonitrile (SAN) copolymer, with at least one acrylate-styrene-acrylonitrile (ASA) rubber with bimodal particle size distribution and an average particle size from 80 nm to 600 nm, and also with an SAN matrix with AN content from 25% by weight to 35% by weight.

2. The process as claimed in claim 1, characterized in that the thermoplastic molding composition comprises at least one rubber-modified styrene-acrylonitrile copolymer, where a rubber component is based on an acrylate-styrene-acrylonitrile copolymer or on a polybutadiene.

3. The process as claimed in claim 1, characterized in that the thermoplastic molding composition comprises at least one impact-modified copolymer or one impact-modified copolymer blend, and also optionally other components, and
    the thermoplastic molding composition is produced from a component comprising water, comprising up to 90% by weight of residual water, and said component is optionally mixed with the other components with devolatilization and/or dewatering, and then the thermoplastic molding composition is discharged from the extruder.

4. The process as claimed in claim 1, characterized in that the process comprises, as at least one step, devolatilization and/or mechanical dewatering.

5. The process as claimed in claim 1, characterized in that the diameter (Ds) of at least one screw of the screw-based extruder (S) is from 80 mm to 180 mm.

6. The process as claimed in claim 1, characterized in that the rotation rate (DZ) of the at least one screw of the screw-based extruder (S) is from 100 rpm to 200 rpm.

7. The process as claimed in claim 1, characterized in that the pressure in the squeeze zone (Q) of the screw-based extruder is from 10 bar to 55 bar.

8. The process as claimed in claim 1, characterized in that the screw-based extruder (S) is equipped with at least two co- or contrarotating screws with diameter (Ds) from 30 mm to 230 mm.

9. The process as claimed in claim 1, characterized in that the metal-wire-mesh composite sheet has from 2 to 30 layers.

10. The process as claimed in claim 1, characterized in that the average mesh width of the smallest-mesh layer of the metal-wire-mesh composite sheet (MV) is from 1 µm to 500 µm.

11. A thermoplastic molding composition produced in an extruder by a process as claimed in claim 1, where the thermoplastic molding composition comprises at least one rubber-modified styrene-acrylonitrile (SAN) copolymer, with at least one acrylate-styrene-acrylonitrile (ASA) rubber with bimodal particle size distribution and an average particle size from 80 nm to 600 nm, and also with an SAN matrix with AN content from 25% by weight to 35% by weight.

12. The thermoplastic molding composition as claimed in claim 11, comprising a butyl acrylate-styrene-acrylonitrile copolymer, and also an SAN copolymer, and optionally other components, characterized by less than 20 ppm content of 1-butene.

13. The thermoplastic molding composition as claimed in claim 11, characterized by less than 50 ppm content of 1-butene, based on the total mass of the thermoplastic molding composition.

* * * * *